United States Patent [19]

Bassard

[11] 3,952,184
[45] Apr. 20, 1976

[54] APPARATUS FOR THE AUTOMATIC CLASSIFYING AND FINDING OF GROUPINGS OF SERIES OF DISTINGUISHING SIGNS ACCORDING TO THE RISKS OF CONFLICT THEY INVOLVE WITH GIVEN GROUPINGS

[75] Inventor: Paul F. Bassard, Paris, France

[73] Assignee: Societe de Depot de Margues Sodema, Societe Anonyme, Paris, France

[22] Filed: Apr. 12, 1974

[21] Appl. No.: 460,651

[30] Foreign Application Priority Data
Apr. 13, 1973 France .............................. 73.13440

[52] U.S. Cl. ............................. 235/150; 340/172.5; 444/1
[51] Int. Cl.² ......................................... G06F 7/00
[58] Field of Search ...................... 444/1; 340/172.5; 235/152, 150

[56] References Cited
UNITED STATES PATENTS

| | | | |
|---|---|---|---|
| 3,587,057 | 6/1971 | Armstrong ....................... | 340/172.5 |
| 3,611,316 | 10/1971 | Woodrum ......................... | 340/172.5 |
| T922,008 | 5/1974 | Gause et al ............................. | 444/1 |

Primary Examiner—Edward J. Wise
Attorney, Agent, or Firm—Sughrue, Rothwell, Mion, Zinn & Macpeak

[57] ABSTRACT

A method and apparatus are disclosed for automatically finding and classifying any group of trademarks belonging to an initial series and having similarities with groups of trademarks of another series. The classification is arranged in increasing or decreasing order according to the risks of conflict involved in these similarities. The analysis of the similarities provides an indication of the likelihood of confusion between trademarks which are proposed to be registered and those already registered. The apparatus includes a memory for storing the first and second groupings of trademarks. The groupings are then analyzed in pairs by a comparing and counting device which determines for each pair the numbers of the shortest and longest groupings, the longest sequence of common signs to both groupings, the number of signs common to both groupings other than those in the sequence and the number of signs of the longest groupings not found in the other grouping. These various quantities are then used to compute a coefficient of simularity which is in turn used to compute the evaluation of the risk of conflict. The computed risks of conflict exceeding a predetermined value are classified in ascending or descending order and printed for final evaluation.

10 Claims, 6 Drawing Figures

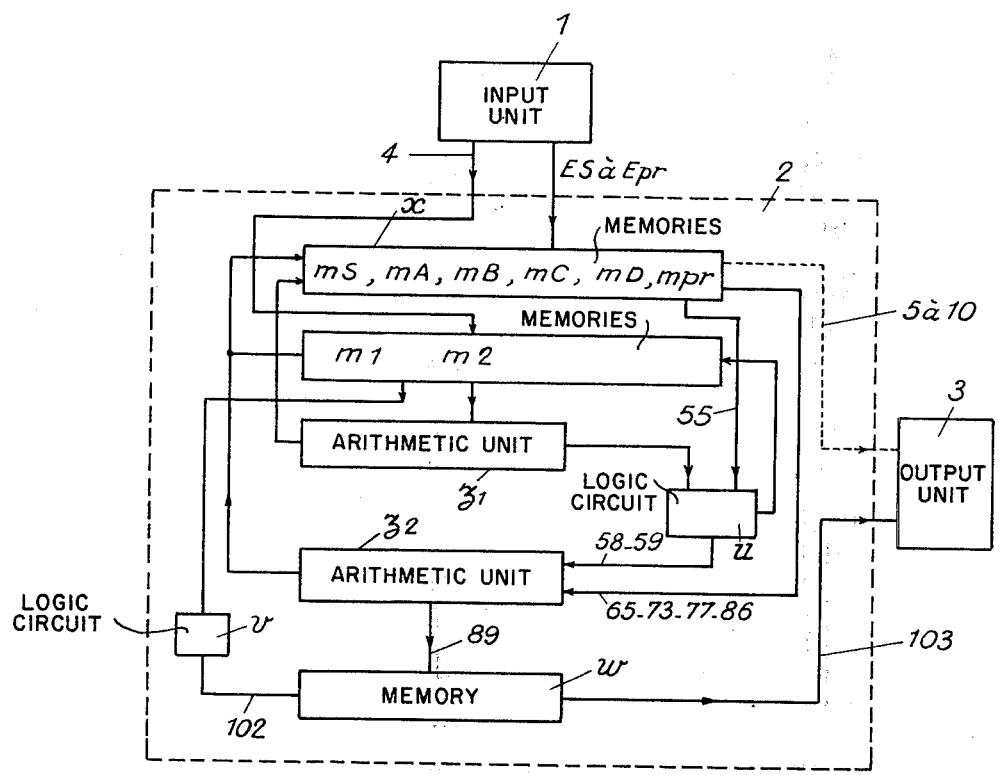

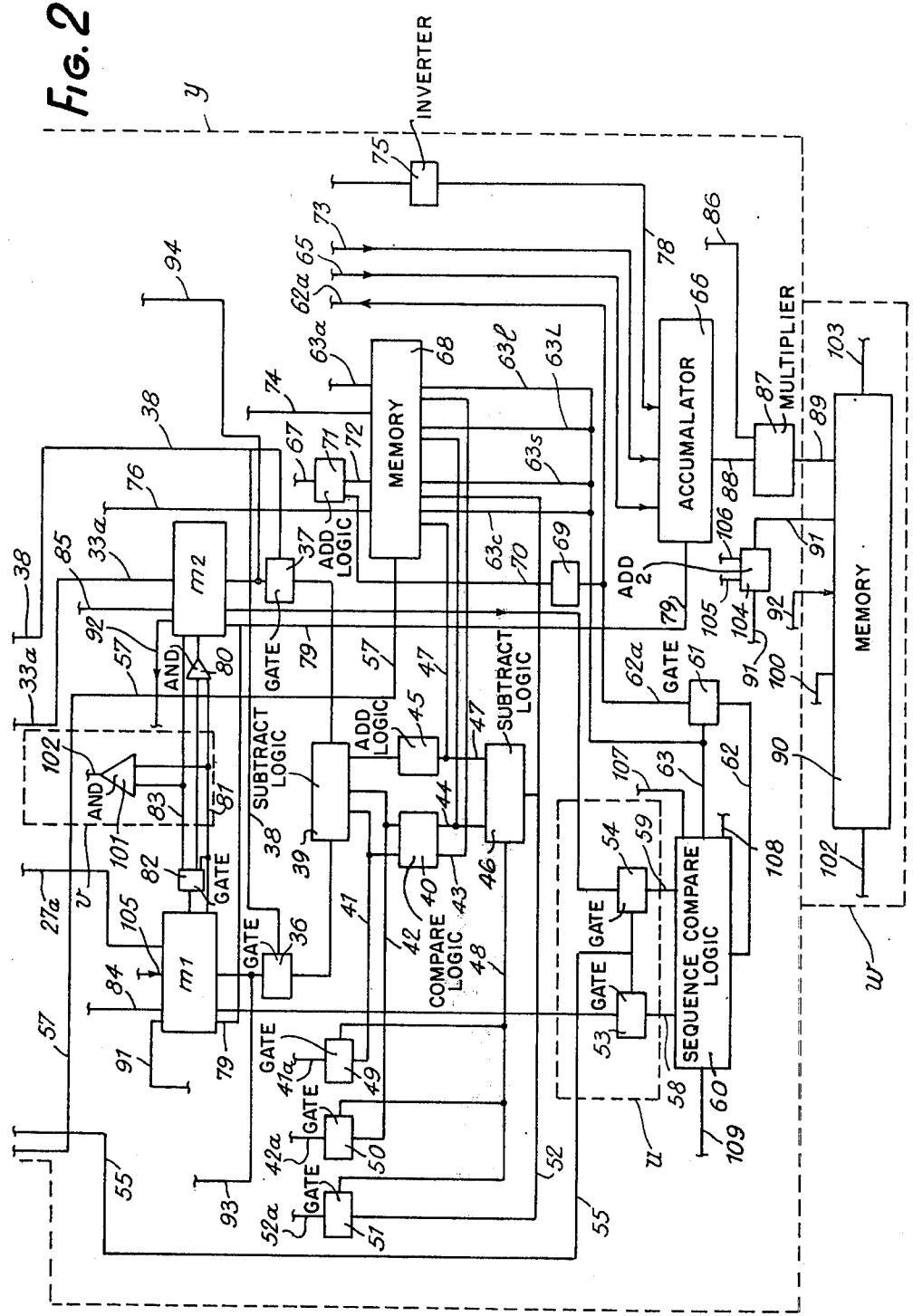

Fig. 4

|  | 22 |  |  | 23 |  | 24 |  |  | 25 |  | 26 |  |  |
|---|---|---|---|---|---|---|---|---|---|---|---|---|---|
|  | 1 | 2 | 3 | 1 | 2 | 1 | 2 | 3 | 1 | 2 | 1 | 2 | 3 |
| 22-1 | 15 | 8 | 8 | 8 | 8 | 6 | 6 | 6 | 6 | 5 | 8 | 6 | 5 |
| 22-2 | 8 | 15 | 10 | 8 | 8 | 6 | 6 | 6 | 6 | 5 | 6 | 6 | 5 |
| 22-3 | 8 | 10 | 15 | 8 | 8 | 6 | 6 | 6 | 6 | 5 | 6 | 6 | 5 |
| 23{1 | 8 | 8 | 8 | 15 | 12 | 8 | 8 | 8 | 8 | 6 | 8 | 7 | 5 |
| 23{2 | 8 | 8 | 8 | 12 | 15 | 8 | 8 | 8 | 8 | 6 | 8 | 7 | 5 |
| 24{1 | 6 | 6 | 6 | 8 | 8 | 15 | 10 | 10 | 9 | 8 | 9 | 7 | 5 |
| 24{2 | 6 | 6 | 6 | 8 | 8 | 10 | 15 | 10 | 9 | 8 | 8 | 7 | 5 |
| 24{3 | 6 | 6 | 6 | 8 | 8 | 10 | 10 | 15 | 9 | 8 | 8 | 7 | 5 |
| 25{1 | 6 | 6 | 6 | 8 | 8 | 9 | 9 | 9 | 15 | 10 | 10 | 9 | 5 |
| 25{2 | 5 | 5 | 5 | 6 | 6 | 8 | 8 | 8 | 10 | 15 | 8 | 7 | 5 |
| 26{1 | 8 | 6 | 6 | 8 | 8 | 9 | 8 | 8 | 10 | 8 | 15 | 7 | 5 |
| 26{2 | 6 | 6 | 6 | 7 | 7 | 7 | 7 | 7 | 9 | 7 | 7 | 15 | 5 |
| 26{3 | 5 | 5 | 5 | 5 | 5 | 5 | 5 | 5 | 5 | 5 | 5 | 5 | 15 |

| MC | 3 | 4 | 5 | 6 | 7 | 8 | 9 | 10 | + |
|---|---|---|---|---|---|---|---|---|---|
| 3 | 2 | 2 | 2 | 2 | 2 | 2 | 2 | 2 | 2 |
| 4 | 2 | 2 | 3 | 3 | 3 | 3 | 3 | 3 | 3 |
| 5 | 2 | 3 | 3 | 3 | 3 | 3 | 3 | 3 | 3 |
| 6 | 2 | 3 | 3 | 4 | 4 | 4 | 4 | 4 | 4 |
| 7 | 2 | 3 | 3 | 4 | 5 | 5 | 5 | 5 | 5 |
| 8 | 2 | 3 | 3 | 4 | 5 | 5 | 5 | 5 | 5 |
| 9 | 2 | 3 | 3 | 4 | 5 | 5 | 6 | 6 | 6 |
| 10 | 2 | 3 | 3 | 4 | 5 | 5 | 6 | 7 | 7 |
| − | 2 | 3 | 3 | 4 | 5 | 5 | 6 | 7 | 8 |

APPARATUS FOR THE AUTOMATIC CLASSIFYING AND FINDING OF GROUPINGS OF SERIES OF DISTINGUISHING SIGNS ACCORDING TO THE RISKS OF CONFLICT THEY INVOLVE WITH GIVEN GROUPINGS

BACKGROUND OF THE INVENTION

1. Field of the Invention

The present invention concerns a method and an apparatus for automatically finding and classifying any group of distinguishing signs such as names and, in particular, marks belonging to an initial series and liable to have one or more similarities with the groups of signs of another series, this classification being arranged in increasing or decreasing order according to the degree of the risks of conflict involved in these similarities. The present invention concerns, more particularly, the analysis of the similarities liable to involve a likelihood of confusion between marks of a relatively restricted number, which are proposed to be registered, and each of a number of already known marks, the number of which may be relatively high, on the order of 10,000 to 100,000, for example.

2. Description of the Prior Art

Conventional apparatus for mechanical recording or mecanography, as well as large assemblies for the processing of information, such as those known under the generic term of "ordinators", permit many operations of comparison, selection, classification and printing of data, but no known apparatus or assembly has been specially designed or adapted to date both for the purpose of automatically detecting pairs of groupings of signs formed for example by names, each pair, formed by a name belonging to an initial series and by a name belonging to a second series, responding to certain criteria of similarities, and of checking from among all the pairs found, those for which these similarities are liable to involve confusion or confliction between these names. So much the more, because none of these devices has been designed or provided to effect the classifying of these pairs in an increasing or decreasing order of the seriousness of the risk of conflict.

By way of example, French Patent No. 1,037,840, filed May 29, 1951, for a perforated card, concerns a method of using perforated cards in order to discover mechanically the connections existing between trade marks, but it is characterised only in that each syllable of a mark is associated with particular zone preferably formed by an odd number of columns, and in that the center column of each zone is associated with the vowel of the corresponding syllable. Hence, by using any phonetic transcription of the mark, it is easy to recognise the phonetic similarities existing between any arbitrary grouping of syllables: second and third syllables, two final syllables, and so on. However, although the new design of the perforated card, which is the object of French Patent No. 1,037,840, facilitates its use on simple mechanographical apparatus by avoiding the inclusion of circuits intended to find the column in which the vowel is disposed, transcribed into phonetic form, this card does not make it possible to find automatically all the marks contained in a file and having such similarities with a proposed mark that they will involve the risk of causing a conflict with the latter. Obviously, such a card cannot solve the problem of automatically classifying these marks in order of importance with regard to risks of conflict. In other words, the method described in French Patent No. 1,037,840 has the sole effect of facilitating the use of conventional apparatus in order to obtain conventional alphabetical or phonetic lists and these lists may comprise, as stated above, any arbitrary groupings of syllables. However, even assuming that the number of marks divided into various groupings of letters and syllables is increased for the purpose of detecting subsequently and in alphabetical order the similarities presented by a new proposed mark for comparison of each syllable or group of syllables thereof with syllables and grouping of syllables of known marks, only an uncertain result and a prohibitive loss of time would ensue, since the lists of known marks and the splitting up or phonetic transcription thereof would increase in such proportions as to make any search illusory. In particular, it would not be possible to discover important similarities, such as the presence of common discontinuous sequences, since, according to conventional methods, it would be necessary to have, previous to the knowledge of the proposed mark, all the known marks already split up in a particular manner, this arrangement not being known on the date of the preparation of the lists of known marks and the lists of the derived words resulting from the arbitrary splitting up of the word.

The second French Patent, relating to a "Method of making indexes" and "Mechanographical carriers" for recognizing similar marks, bears the number 1,473,420 and describes the manner of inserting new cards in a large file of perforated cards for indexing known marks, in order to draw up lists of alphabetically classified marks. There is therefore no point in adding new comments to those already made with regard to the preceding patent.

As to modern devices for the processing of information, the applicant is unaware at present of any system of devices especially designed originally, or even simply adapted subsequently to solve the problem of automatically finding any groups of distinguishing signs and, in particular, actual risks of conflict with those of a second series.

SUMMARY OF THE INVENTION

The present invention concerns a method and the apparatus for automatically classifying and finding groupings of distinguishing MC signs, such as names or marks associated with a first series and capable of showing similarities with the groupings of distinguishing MP signs of a second series, said similarities possibly involving a risk of conflict between them, the invention being characterised by the storage of the said MC and MP groupings, then analyzed in pairs by a comparing and counting device, each pair being composed of an MCi group and an MPj group, the comparing and counting device determining for each pair the numbers of $l$ and $L$ signs of the shortest and longest groupings respectively, the number $a$, the signs of the longest sequence of signs common to both groupings, this sequence being capable of interruption by dissimilar signs, but the similar signs of the common sequence being disposed in both groupings in the same lines, counting from the first sign of the sequence, the number $b$, the signs common to both groupings other than those of said sequence, the number $c$, signs of the longest groupings not found in the other grouping, in order to transfer the pairs of values $(a,l)$, $(b,L)$ and $(c,L)$ to the output control devices of memories containing the values of the functions $A(a,l)$, $B(b,L)$ $C(c,L)$ the values $A_{ij}$, $B_{ij}$ and $C_{ij}$ supplied by the said memories being transferred to an adding device to determine a coefficient of similarity ($A_{ij} + B_{ij} - C_{ij}$), the functions A, B and C being functions having slopes increasing with $a$, $b$ and $c$ respectively for $l$ and $L$ constants, the co-efficient of similarity being possibly transferred to a multiplier for calculating the evaluation of the risk of conflict $R_{ij} = D_{ij} (A_{ij} + B_{ij} + C_{ij})$; $D_{ij}$ being a coefficient of the function of the similarities of any information associated with the said groupings, services or goods when the grouping is a mark, the coefficient $D_{ij}$ being transferred from a memory containing, for any pair of items of information, similar or identical goods and services, a value of the corresponding coefficient D.

It will be observed that this method refers to "all" the basic similarities, that is to say, to the finding of all the common signs and not to arbitrary fractionings and regroupings which in previous methods led to systematic losses of known marks sometimes showing major similarities with marks which it is proposed to register; on the other hand, the function R for the evaluation of the risks of conflict, providing values automatically deduced from completely indexed similarities, makes it possible to eliminate from the search any arbitrary and subjective character, thus ensuring a constant quality of the method. Since this method may be applied to any distinguishing signs, it is applicable to names in any language and therefore to any particular phonetic transcription of the language under consideration.

Moreover, since the applicant has been able to show, by using the results of numerous statistical calculations and experiments on MC and MP groups formed of known MC marks and proposed MP marks, that the function R correctly reflects the measurement of the risk of conflict between MC marks and MP marks as soon as it has been correctly determined for each MCi, Mpj group, the numbers of the letters l and L of the compared marks, the number $a$ of the longest common sequence defined above, the number $b$ of letters common to both the marks Mci and Mpj other than the "$a$'s", letters of the longest sequence, the number $c$ of letters of the longest mark not being located in the other mark, and from then the functions A, B and C increase the more the marks comprise a larger number of letters. This important fact is utilized by the applicant in order to modify the values of these functions according to the requirements of any statistical and linguistic data in order not to give to the coefficient of the risk of conflict R an arbitrary value, but an actual value of this risk appraised according to the said data.

Furthermore, the applicant has been able to show that it was possible, by simple consideration of the numbers of distinguishing signs common to both groups of compared signs and their number of signs l and L, to determine whether the groups of the pair under consideration have a risk of conflict sufficiently slight for the calculation of the coefficient $R_{ij}$ to become pointless. For this purpose, the comparing and calculating device determines only for each pair MCi, MPj the numbers $s$, $l$ and $L$ and the apparatus ensures the comparison of the value obtained by a function S ($s$, l, L) increasing all the more with $s$ as $l$ and L are large, with a minimum value Sm of this function, the comparing and calculating device effecting the calculation of the coefficient of evaulation of the risk of conflict $R_{ij}$ each time the value of $S_{ij}$ is greater than or equal to Sm.

Although modern comparing and counting devices are very rapid, this method assumes great importance when it is proposed to compare an MP mark with a very large number of known marks of the order of 50,000 for example. Another advantage of the method is that, since one is free to select the value Sm, this may be varied to modify the threshold value Rm of the function R below which there is no need to consider the result of the comparison of the marks of the pair (MCi, MPj). Therefore, when there is a large number of MC marks already having between them numerous similarities, the value Sm may be taken from a value S'm in order to retain the pairs MCi, MPj having a coefficient $R_{ij}$ greater than a value R'm, itself greater than Rm. Thus only the pairs are retained, whose similarities are greater than those offered by the marks MC under consideration.

Since modern digital data processors are capable, by reason of their design, to simulate practically any other calculator or machine, it is obvious that they are capable of simulating the apparatus for carrying out the method of the present invention. It will be noted, however, that another advantage of the present invention, is to permit such simulations by very simple programs. Likewise, the operation of numerous calculators may be modified in oorder to enable them to carry the invention into practice.

Thus, according to the present invention, any system comprising at least one reading device, a printing device and an assembly of memories and a logic circuit may be modified and adapted to determine and calculate the above-defined values $S_{ij}$ $R_{ij}$, an initial logic circuit involving, when $S_{ij}$ is greater than Sm, the calculation of $R_{ij}$ and a second logic circuit involving, after the calculation of the values $R_{ij}$ of the last pair, initially, the automatic sorting of the pairs of containing the same MPj grouping according to increasing or decreasing order of the $R_{ij}$ values corresponding thereto, then the printing of these results.

Thus the list of "all" known marks detected as liable to be confounded with a proposed mark is easily and automatically obtained, these marks being classified according to the "actual" serious risk of conflict, which results were never before the present invention possible to obtain.

Thus, while previous methods were carried out by conventional apparatus for obtaining arbitrary alphabetical classifications which the searcher had to interpret in order to appreciate the risk of conflict between a certain number of groups of common signs which had been selected arbitrarily and a few groups of signs which it was proposed to use, the present invention makes it possible by means of the method employed and the apparatus for carrying out the method, to obtain automatically and with a high degree of exactness of evaluation, the state of "all" known groupings, of which the risk of confliction with the groupings of signs which it is proposed to use are actual and greater than any given risk determined by the value obtained by an experimentally selected function. Thus the weaknesses of all human searchers are eliminated: forgetfulness, errors of evaluation, variations of evaluation from one searcher to the other, while being free to modify the values of R according to the statistical study of the number of pairs for which the risk R is greater than a given threshold.

BRIEF DESCRIPTION OF THE DRAWINGS

In order that the invention may be readily carried into practice, one embodiment of the apparatus for carrying out the automatic method of selecting and classifying pairs of marks by increasing and decreasing risk of confliction will now be described in detail by way of example, with reference to the accompanying drawings in which:

FIG. 1 is a block diagram of the apparatus according to the invention,

FIGS. 2a and 2b show the circuits of the apparatus of FIG. 1 in greater detail, and FIGS. 3 – 5 are graphical and tabular presentations of the values of the functions A, B, C, D and S defined above.

DESCRIPTION OF THE PREFERRED EMBODIMENT

Figure 2A:
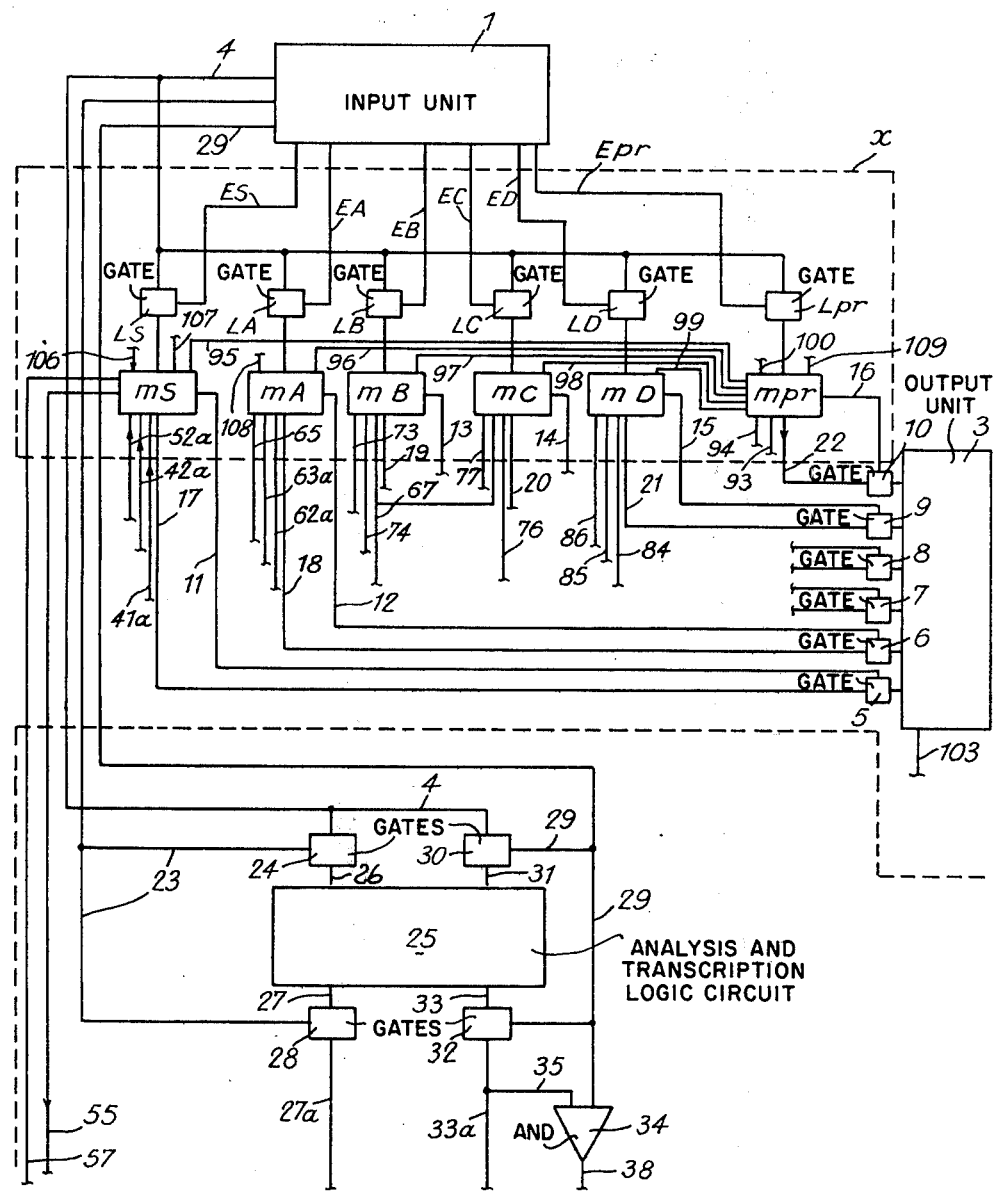

Before describing in detail the method for the automatic finding and classifying of Trade Marks which is the object of the present invention, as also the apparatus for carrying out the method, said apparatus being shown in the form of logic circuit blocks, it should be clearly remembered that it has long been known to provide logic circuits representing functions of binary variables: algebraic sums, products, divisions, comparisons, etc. and that these circuits may be designed as a function of this or that type of components, the binary variables being, for example, voltages or currents. In other words, it has long been known how to produce from conventional components, such as diodes, transistors, magnetic cores, for example, not only inclusion, exclusion and the like elementary logic circuits, including circuits for the transfer of information with phase displacement, all obtainable in commerce, but also any desired logic circuits comprising these conventional logic circuits.

Again, the existence of readers of various memory carriers has long been known: perforated cards and tapes, magnetic cards, discs and tapes, magnetic cores, etc. and, additionally it is known how to transfer the information resulting from a reading to any one of the usual carriers and, in particular, to simple sheets by means of a printing mechanism.

The apparatus is therefore represented by the assembly of all its components, each one of them being represented by a simple rectangle. Hence the readers of cards, the gates controlling the movement of an item of information, the logic circuits of subtraction, addition, comparison, transfer of information, the printing units, have all been shown in a conventional manner.

It will also be noted that if in fact all the logic circuits characterising the apparatus are shown, on the other hand, the tedious representation of synchronization controls has been omitted, this function being either obvious or not required according to the type of logic and adapted components. It has therefore been preferred, whenever thought necessary for the sake of clarity, to add an extra logic component rather than to use the same logic component provided with additional properties, for example, when it would have been necessary to show in detail each of the circuits controlling it at different times or to show the succession at the time of the control pulses coming from the same line.

In the embodiment shown, the automatic search of all knwon MC marks having similarities with a proposed MP mark and the automatic classifying of MC marks selected in this manner according to the increasing or decreasing risk of conflict they involve with the MP mark, is effected by previously recording this mark on a perforated card. This card also contains any other useful information. MC marks are also recorded on perforated cards, the related information comprising, for example, the references of the Official Gazette in which the mark was published; In particular, the date and page. It will be understood, however, that these marks may also be recorded on other carriers; magnetic discs or tapes, these means merely being equivalent.

The following two examples of automatic evaluation of the risk of conflict between two marks will give an idea of the complexity of the problem to be solved and will also reveal how, by the choice of the similarities involved and the means employed, the automatic finding of "any" groups of distinguishing signs associated with a series of several tens of thousands of groupings presented an "actual" risk of conflict has been possible. It will be noted that everything to be set forth concerning the marks and the readings involved in their composition applies to any groupings of signs; names for example and all signs.

The similaraties involved are defined by the series of the following variables:

The number $a$ of letters of the longest continuous or discontinuous sequence common to both the compared MP, MC marks, the similar letters of the sequence being disposed on the same lines counting from the first letter of the sequence.

The number $b$ of letters common to MP and MC other than those of the longest sequence.

The number $c$ of letters of the longest mark without correspondence in the other mark.

The products or services $d_1$, $d_2$ to which the MP, MC marks apply.

The number of letters of each of the marks of the pair MP, MC, $l$ designating the number of letters of the shortest mark and L the number of letters of the longest mark.

Let it be assumed that it is necessary to determine the value of the risk of confliction between the MC mark "PROCTERIL" filed in Class 22 to designate padding material and the MP mark "PIOSTERALE" intended to be filed in Class 24, but for fabrics.

The longest sequence being P-O-TER-L, the number $a$ is equal to 6.

Since the number of common letters is equal to 7, the number $b = 7 - a = 1$.

The number $c$ is equal to 3.

The number $l$ is equal to 9 and

The number L is equal to 10.

Figure 3:
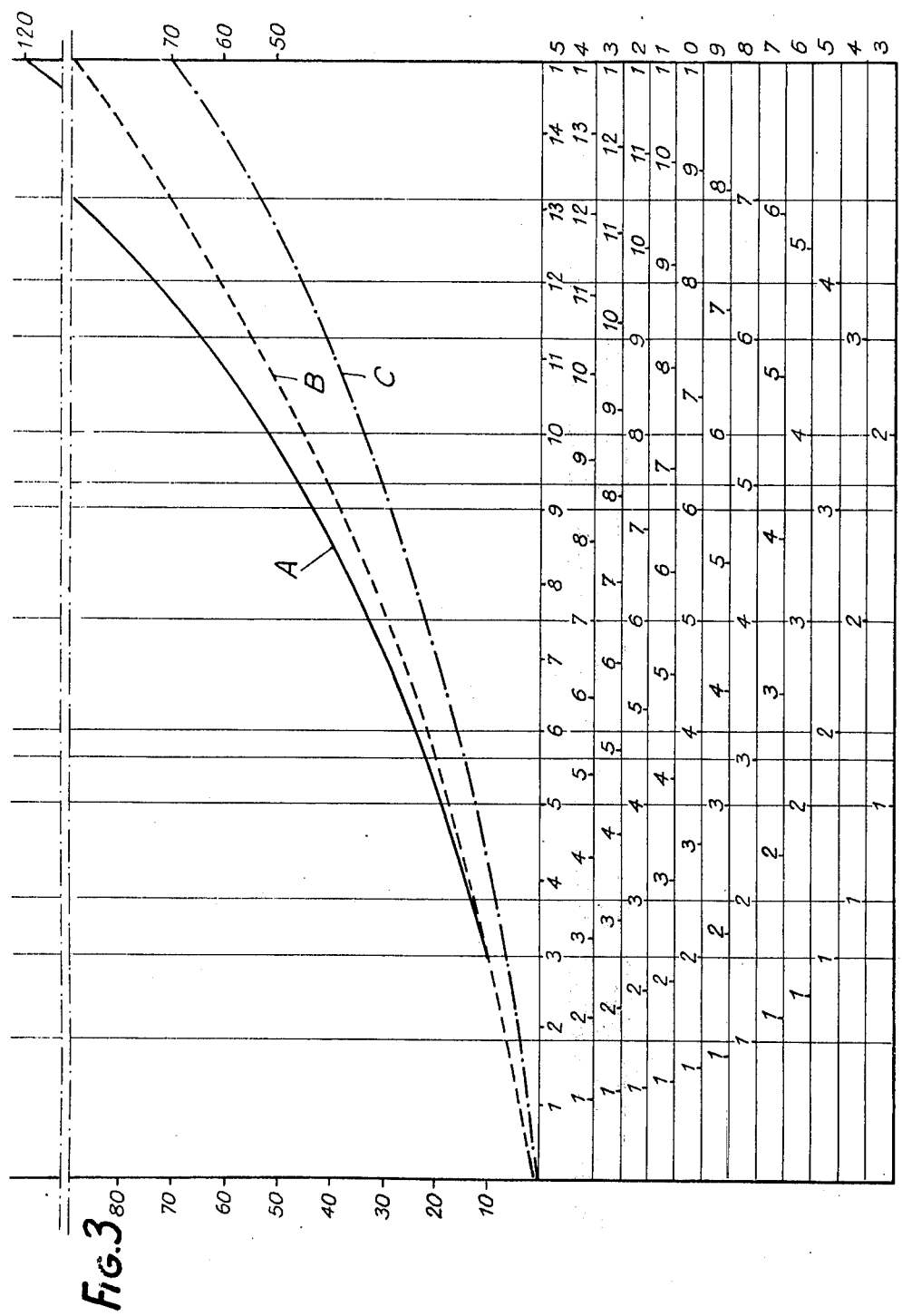

With reference to FIG. 3, it will be seen that three curves A, B, C, are shown therein, the abscissae of which are shown by the points of horizontal lines bearing references 3 to 15. These abscissae of whole values correspond to the values $a$, $b$ or $c$ according to whether the curves A, B and C are considered and the references 3 – 15 15 of each line of abscissae represent the numbers of letters $l$ and L of the marks under consideration. The values of the functions A, B and C are given as ordinates.

These functions, the values of which have been determined experimentally, make it possible to use a simple formula R = D (A+B−C) the value of which furnishes a coherent measure of the risks of conflict between two marks.

Examination of each of the curves representing the functions A, B, C shows, on the one hand, that their slopes increase respectively with the values $a$, $b$ and $c$ for constant lengths $l$ and L of the marks and that, on the other hand, for constant values of the variables $a$, $b$, $c$, the values A, B, C decrease for increasing values of the numbers of letters $l$ and L of the marks. The values indicated may be modified without departing from the scope of the present invention, provided that the double condition of variations that has just been emphasized is taken into account.

In the example concerned, $a$ being equal to 6 and $l$ to 9, it is only necessary to refer to FIG. 3 on the abscissa line bearing reference numeral 9 and to read the corresponding ordinate at the abscissa point 6 to see that A assumes the value 52.

Similarly, $b$ being equal to $l$ and L to 10, it is only necessary to read the ordinate of the curve B corresponding to the point $l$ on the abscissa line 10 to see that the value of B is equal to 5.

Since the number of different letters $c$ is equal to 3 and L to 10, the curve C indicates a value equal to 10 for an abscissa point 3.

The expression A+B−C is therefore equal to 52 + 5 − 10, i.e. 47. It could define the degree of resemblance of all data, but in the particular case of marks, it is indispensable for evaluating the actual risks of conflict to take into account the products or services to which the mark is applied.

For this purpose a correction factor D is introduced, a function of the products concerned or simply of the sub-classes in which the products or services may be grouped within the same class. Hence, by way of example, a double entry list is shown in FIG. 4, the vertical and horizontal entries of which have been limited to classes 22 to 26 only, the classes 23 and 25 comprising two sub-classes, the others three. It is clear that the general list of products and services need not be shown entirely, since common sense is enough to deduce from the values indicated for identical, similar or different goods, those which must be used when one is dealing with identical, similar or different goods or services belonging to other classes.

In the example selected PROCTERIL having been registered to designate padding materials, $d_1$ assumes the value 22 - 2, the padding material being assumed grouped with the goods of sub-class 2 of class 22. Since PIOSTERALE has to be registered to designate "fabrics" belonging to sub-class 1 of class 24, the variable $d_2$ assumes the value 24 - 1. The list shown in FIG. 4 and all the values of which have been multiplied by 10 to facilitate the reading thereof indicates for ($d_1$, $d_2$) a value 6. Under these conditions and despite the relatively high value of the expression A + B − C, the risk of conflict drops to the value 47 × 0.6 = 28.2.

On the other hand, if it was necessary to compare the marks PROCTERIL and PROSTERIL, both applied to cords and string, it will be seen that $a = 7$, $b = 0$, $c = 2$ and $l = L = 9$. The value of the function A (7.9) is equal to 68, that of B (0.9) to 0 and that of C (2.9) to 8. The expression A + B − C therefore assumes the value 60. However, the identity of the products involves identical values of $d_1$ and $d_2$, because they are both classified in sub-class 22 - 1, so that the value of the coefficient D assumes the value 1.5. Hence, the risk of conflict becomes 60 × 1.5, i.e. 90.

Despite the importance of the correction factor D in the matter of marks, the applicant has demonstrated a function S ($s$, $l$, L) represented by the list shown in FIG. 5 showing that the risk of conflict R between an MC mark and an MP mark is always slight if the sole value of the function S ($s$, $l$, L) is less than a given value Sm. The list shown in FIG. 5 is in the form of a double entry Table, one for introducing the number of letters $l$ of the shortest mark, the other for the introduction of the longest mark L, offers a series of values Sm such that it is only necessary for the number of similar letters $s$ of the marks to be compared to be less than Sm to be certain that the calculated risk R is itself less than a threshold Rm below which the risk may be neglected. Conversely, if S > Sm, the comparison may be effected. Hence, in both the preceding examples, the values Sm are equal to 6 according to the table shown in FIG. 5. The number of similar letters in these examples being equal to 7, these marks could be preserved. Experience shows that, of a large file, 80% of the comparisons could be eliminated.

According to a preferred method of carrying out the present invention, each mark is split up at the time it is read by counting the number of times that each letter is used and by recording in the memory the image formed by the alphabetical classification of these letters in which each letter is associated with the number of times it is used. Thus, the image of the mark PROCTERIL is 1C, 1E, 1I, 1L, 1O, 1P, 2R, 1T and that of PIOSTERALE 1A, 2E, 1T, 1L, 1O, 1P, 1R, 1S, 1T.

For each mark it is only necessary to obtain the sum of the numbers A appertaining to each letter in order to obtain the quantity $l$ and L, respectively equal to 9 and 10 in this example. In general, if Im (p, MCj) and Im (p, MPi) are used to designate the numbers appearing in line $p$ of the images of MCj and MPi and if, for each line, the difference $dp =$ Im ($d$, MPi) − Im ($p$, MCj) is calculated in cases where MPi is the longest mark, or Im ($p$, MCj) − Im, ($p$, MPi) in the contrary case, it will be seen that the quantity $c$ is equal to the sum of the quantity of $dp$ by agreeing to associate the number 0 with the letters not appearing in the mark concerned and to consider only the quantity $dp$, the values of which are positive. Hence, in the example concerned, the sum of the quantities $dp$ is equal to 3. The quantity $s$ is immediately deduced therefrom, representing the sum of known letters of the pair (MPi, MCj) which is equal to L − $c$ or 7 in the pair given.

The present invention makes it possible to take into account the statistical evolution of the groupings of known MC signs, as also the special features of certain groupings. For this purpose the values of the functions A, B, C and S have been modified according to the special features of the series. Therefore, when it is a question for example of evaluating marks of foreign origin, the pronunciation known in the areas in which the mark is used corresponds to groupings of letters other than those used in English for the same pronunciation. Under these conditions, it is possible to modify the values of the functions A, B and C which would be obtained if the mark and the pronunciation of an English word, independently of these special cases, as also phonetic or graphic resemblances, which it is always possible to take into account by creating special cards called parameter cards, modifying the functions A, B and C. It may be necessary to modify these functions by taking into account the frequency of repetition of a certain group of letters common to the pairs (MP, MC). Consequently, for certain MP cards it is possible to provide parameter cards modifying the values of the functions A, B and C and, if necessary, D.

The apparatus for carrying out the method which is the object of the present invention, as shown in FIG. 1 is composed, like all apparatus for the processing of data, substantially of an input unit for the data 1, a reader of perforated cards in the embodiments selected, of an assembly of memories and logic circuits indicated by the general reference 2 and an output unit 3 for the results, in this case, a print out unit. It differs relatively to previous apparatus by the assembly 2 which, in addition to an assembly of memories mS mA, mB, mC, mD, mpr, indicated by the general reference X and the assembly y formed by the memories $m_1$ and $m_2$ serving for the recording of the data on the MP and MC cards respectively, is composed in particular of an initial arithmetic unit $z_1$ receiving the data of y in order to carry out an initial evaluation of the similarities between the marks of a pair (MP, MC) by the calculation of the quantities s, l and L of a logic circuit u in order to interrupt the calculations and control the transfer of new data to $z_1$ in the event of insufficient similarities determined by the comparison of the quantities s and S (s, l, L,) and, in the contrary case, in order to control the calculation in a second arithmetic unit device $z_2$ of the coefficient of the risk of conflict between the marks of the pair analyzed, a logic circuit v controlling, at the end of the evaluation, the risks of conflict between the marks of the last pair, the automatic sorting of the MC cards by the coefficient of increasing or decreasing risk of conflict of the MC marks relative to a proposed MP mark.

A more detailed representation of this general structure is given in FIG. 2, to which reference is made in order to describe not only the method and apparatus permitting the obtaining, according to this method, of the selection and the classification of the marks according to the increasing or decreasing risks of conflict between the marks of a pair (MC, MP) for all the MC marks checked.

In the course of the first phase, there are recorded in memories specified by x, the data representing the functions:

S (s, L, l); A (a, l); B (b,L); C (c,L); D ($d_1d_2$), as also all the parameters capable of affecting the values of these functions, including, in particular, the minimum value $S_m$ below which the values R = D (A + B − C) for the pair of marks (MC, MP) concerned are not calculated.

The operations of the selections of circuits as a function of the reading of data characteristic of information on a card being well known, ES, EA, EB, EC, ED, Epr are used to represent the excitation circuits of the logic gates LS, LA, LB, LC, LD and Lpr giving, for the information read and transmitted through the channel 4, access to the memories or parts of memories mS, mA, mB, mC, mD, mpr. The result is that all the information transmitted from the reader 1 by the reading of the cards containing the values of the function S for each value of s, L, and of l, are transmitted through the channel 4 to the memory mS, that all the information relating to the values of A, a, l, are transmitted to the memory mA and so on for the values relating to the functions B, C and D which are recorded in the memories mB, mC and mD respectively. With regard to the values of the parameters pr, these values are registered preferably directly in the memory mpr according to the same process. These cards can contain all the useful indications for a new presentation of a printed condition, as also the changes of the values of the functions and, in particular, of the value of $S_m$.

The series of binary positions liable to be occupied by the information S, A, B, C, D and pr, may be as large as desired. In practice, 6,000 positions are sufficient, the access logic may be very simple, the value of 2 or 3 variables, for example, si, Li, li, easily determining the destination of the result Si ($s_i$, $L_i$, $l_i$) whether it is a question of a disc memory or a core memory, for example.

When desired, all or part of the information contained in the memories mS, mA, mB, mC, mD and mpr may also be printed. For this purpose, logic gates 5 – 10 are provided, all of which may be controlled either by a circuit coming directly from the memory from which the transfer of information to the print out unit 3 is required — as shown by ciruits 11 – 16, or by any other logic circuit, the circuits 17 – 22 transferring the values of the variables and the functions read in the memories to the print out unit 3. It is therefore easily possible to check the data recorded in the memories associated with the functions and parameters.

The recording of the proposed MP marks is effectd in the memory $m_1$ and is accompanied by an analysis of the letters of the mark read for registering its image I(MP) such as defined above. For this purpose, each card containing an MP mark is read by the reader 1 and is accompanied by the excitation of the circuit 23 opening the gate 24, so that the MP mark and the associated information are transferred through 26 to an analysis and transcription logic circuit in the form of an image 25. By way of example, the mark LISACOL will be associated, at the output 27 of the logic circuit 25, with the word 1AlOl12LlOlS as also with the number $l_1$=7, total number of the letters LISACOL. A gate 28 opened by the link 23 renders possible, through the links 27 and 27a, the transfer of the MP mark, of its image 1 (MP) of $l_1$ and, if necessary, associated information in the memory $m_1$.

An example of similar circuits enables known marks MC to be transferred to the memory $m_2$. For this purpose, the circuit 29 controls the gate 30 permitting the transfer of MC to the logic unit 25 by the links 4 and 31, while the gate 32 permits, through 33 and 33a, the transfer of MC and its image I (MC) as well as the number of letters $l_2$ to the memory $m_2$.

The logic unit 25 for analysis and transcription in the form of an image may be of any type and itself includes an addition circuit in order to count, on the one hand, the number of times a given letter is used and, on the other hand, to effect the sum total of all the values obtained for each of the levels.

The adding device may be a common computer associated with the apparatus, the logic unit 25 merely containing comparing and destination circuits for the alphabetic arrangement of the letters of the mark to be analyzed.

In order to facilitate the description of the apparatus, it may be assumed that the memory $m_1$ has recorded the proposed mark $MP_1$, its image I ($MP_1$) and its total number of letters $lp_1$ and that the first $MC_1$ known mark has just been recorded in the same manner in $m_2$, with its image I ($MC_1$) and its number of letters $lc_1$.

A logic AND circuit 34 connected to the link 29 and triggered by the operation of transfer to $m_2$ by means of the links 33a and 35, opens the gates 36 and 37 through the link 38. These gates control the respective outputs of the images I ($MP_1$) and I ($MC_1$) which are thus transmitted to the logic circuit 39, the function of which is to calculate the differences di of the number of times each given letter is used in $MP_1$ and in $MC_1$. Since these numbers have already been calculated by the logic unit 25, the circuit 39 is a simple subtraction circuit, but emitting a result only when said result is positive, the subtracted numbers being those of the image of the MP or MC mark, the total number of letters of which is the least. The determination of the shortest word is preferably effected in 39. For greater clarity, a logic circuit 40 is also shown, receiving through the links 41 and 42, the numbers $lc_i$ calculated at 25, this circuit transmitting through 43, the shortest number i.e. $l$ and, through 44, the largest number, i.e., L.

The values $di$ coming from the subtractor 39 are totalled in the adder 45. In this manner the variable $c$ of the function C ($c$,L) defined above, is obtained, representing the incidence of the differences between the marks. The value $c$ thus makes it possible to calculate the number of similar letters $s$ in the two marks which, by definition, is $s = L - c$. This value is obtained by the circuit 46 which receives the value $c$ of 45 by the link 47 and the value L by 44. The value of the function of selection $S_1 = S (s, L, l)$ for the value calculated in this manner is obtained by recording in the memory mS the values of S as a function of $s$, L and $l$. The circuit 46 therefore involves, through 48, the opening of the gates 49, 50 and 51 for access to the memory mS of the value $l$, L transmitted through 41a and 42a and of the value $s_1$ transmitted through 52a. The address or destination reprsented by the assembly $(s_1, L, l)$ involves, through the circuit 55, the opening of the gates 53 and 54 in the only case in which $S_1$ is greater than or equal to a predetermined value Sm, which value may be directly registered in the memory mS on the occassion of the reading of the corresponding cards, i.e., selected according to the parameter cards associated with S. The opening of the gates 53 and 54 triggers the calculation of the coefficient of the risk of conflict.

Conversely, the detection of a value $S_1$ lower than Sm does not involve any excitation of the circuit 55 but causes, through the link 57, the opening of a conventional gate in the memory $m2$ having the effect of giving access to the second $MC_2$ mark when the memory $m1$ contains no other mark than $MP_1$. This involves the development of operations identical to those which have just been described, but this time for the pair ($MP_1, MC_2$). If the new value $S_2$ is still less than Sm', the calculation of $S_3$ is effected, provided by the analysis of the marks of the pair ($MP_1, MC_3$) and so on unil a pair is found involving excitation of the gates 53 and 54 by the link 55 of Ms.

This process could also be followed when the proposed mark $MP_1$ is not alone. However, according to the present invention, it is preferable to analyze a series composed of a large number of proposed MP marks, for example, of the order of 100 to 200, so as to avoid the repetition of loading the memory with an excessive number of known MC marks, which marks could amount, for example to 50,000.

On the other hand, after loading the members all the MC marks and all the MP marks it is preferable to proceed with the analysis of all the pairs ($MC_i, MP_1$) - ($MC_i, MP_2$) ... ($MC_i, MP_n$) then to that of the couples ($MC_{i+1}, MP_1$) ... ($MC_{i+1}, MP_n$), etc ... until the last known mark $MC_k$.

In addition to the advantage obtained by transferring, for the same information waiting in a memory, a smaller number of items of information, in the present example 200 MP marks for an MC card instead of 50,000 MC marks for one MP card, it is possible to know, immediately for any known mark, all the proposed marks liable to involve a risk of conflict with that mark. In view of the very restricted number of MP marks relatively to MC marks, it is possible, even without sorting and without completely calculating the degree of risk of conflict, to prepare a printed statement of this statistical information.

Hence, when the link 57 is excited and the mark $MP_h$ is not the last, the gate 80 is kept closed and does not permit an analysis of the mark $MC_{i+1}$. On the other hand, when the last mark $MP_n$ has been analyzed the circuit 81 is excited and opens the gate 80 which permits $MC_{i+1}$ to be analyzed. Conversely, the circuit 82 involves, with each excitation of 57, the analysis of the MP mark following, i.e. $MP_{k+1}$, except when the circuits 81 and 83 are excited together, that is to say, when the last pair ($MC_k, MP_n$) has been analyzed. The logic circuits making it possible to pass from one mark to the other within a memory have not been shown, since the control of the reading of a memory by successive modifications of a numerical address by increasing the order number of its unit is conventional, and the repetition of the reading during all the n cycles is also a conventional operation.

Resuming the example concerned of the ($MC_1, MP_1$) pair we shall assume now that the value $S_1$ provided by the memory mS opens the gates 53 and 54 through the circuit 55. Under these conditions, the marks $MP_1$ and $MC_1$ are transferred by the links 58 and 59 to the logic unit for finding the sequence 60. The logic circuit concerned is a simple conventional comparing circuit with a change register for comparing the letters of each of the marks in an initial correspondance, then proceding to a similar comparison when one displaces from a unit all the positions of one mark to the other and so on. By counting, with each new comparison, that is to say, with each shift, the number of common letters in the new correspondance row by row, a sequence of similar letters is found arranged in the same manner in each of the marks. By way of example, if the mark $MP_1'$ *METAPIROL* is recorded in the logic circuit 60 and if, in an initial correspondance, it is compared to the mark $MC_1'$ *ARAPANOL* by defining the correspondance by the association of the first letter of $MP_1$ with the first letter of $MC_1$, then the second letter of $MP_1$ with the second letter of $MC_1$ and so on, no identity is detected. An initial shift of one mark relative to the other then associates the second letter of $MP_1$ with the first of $MC_1$, that is to say, the E of $MP_1$ with the A of $MC_1$ and an interuppted sequence AP-OL is made to appear, but in which the sequences AP and OL are separated by the same number of letters. The third shift, associating the third letter of $MP_1$ with the first of $MC_1$ does not bring out any identical sequence, etc. Hence, in this example, the value of the variable $a$ of the function A defined above is equal to 4 the number of identical letters in the same row when the marks are displaced so that the first identical letters are in the same row. This value $a$ is transmitted through the circuit 60 to the gate 61 by the links 62 and thence to the memory mA by the circuit 62.

The gate 61 is opened by the circuit 63 excited at the end of the calculation of the sequence. In order to avoid repetition of the calculations of $c$ and $s$ and to avoid the determination of the numbers of letters $l$ and L, these values may be retained in the memory 68 which is returned to zero by the link 57 each time the value $S_i$ obtained is less than the minimum value Sm. Recording of the value c is effected by the link 47 and that of the value s by the link 52, it is also possible to record therein l by 43 and L by 44. It is therefore only necessary to provide, in parallel with the gate 61, an excitation circuit of the letter l of the memory 68 and an output 63a associated with the value l of the number of letters of the shortest mark of transmit, through the links 62a and 63a, the values calculated of the two variables a and l of the functions A in the memory mA. The series (a, l) may also be considered as the destination of the value of the function A, so that the output 65 of A transmits the value $A_1$ for the variable values a and l calculated for the pair $MP_1$, $MC_1$ concerned.

The value $A_1$ is then transmitted to the accumulated 66 by the circuit 65.

Since the variable b is equal to s—a, according to the definition already given of b which is the number of letters common to MC and MP other than those of the longest sequence a, the calculation s—a is made.

For this purpose the value of s is taken from the memory 68 by controlling the position corresponding to this variable by the shunt 63s in parallel with 63l. The output of s through the link 72 is transmitted to the computer 71 which receives by way of the link 70 the value (—a) obtained through the the inverter 69, the value of a being transmitted to the inverter through the link 62a. It is obvious that the circuit 9 could be included in the circuit 71, the embodiment being described only by way of example. The output circuit 67 of the circuit 71 therefore transmits the value of the variable b associated with the analyzed pair $MP_1$, $MC_1$ to the memory mB. Since the value L is transmitted from the memory 68 controlled by the circuit 63L to the memory mB by the link 74, this memory transmits the value $B_1$ corresponding to the values of the variables b and L to the accumulator 66 through the link 73.

The accumulator therefore registers the value $A_1 + B_1$ to which the value $(-c_1)$ which is transmitted either directly to the memory mC, or by way of the inverter 75. For this purpose the memory mC receives the value c transmitted by the link 76, the latter being controlled by excitation of the circuit 63c. It also receives the variable L through the link 74 also serving the memory mB. The output 77 of mC transmits the value $C_1$ to the invertor 75 which converts the latter to the value $-C_1$ transmitted to the accumulator 66 through 78. Hence the degree of resemblance $A_1 + B_1 - C_1$ is registered in the accumulator 66.

For greater evaluation of the risks of conflict, the value $(A_1 + B_1 - C_1)$ is associated with a coefficient D (dp, dc) registered in the memory mD. The data dp and dc are preferably recorded in the form of codes corresponding to the groups, sub-groups, classes and sub-classes relating to the goods or services for which the mark is to be or intended to be used. These data are preferably retained in the memories, $m_1$ $m_2$ from which they can be read during the excitation of the circuit 79 coming from the detection of the presence of the result A + B — C in the accumulator 66. The data dp and dc are then transmitted from the respective memories $m_1$ and $m_2$ by the links 84 and 85 to the memory mD, The value $D_1$ associated with the data dp and dc is then transmitted from mD through the link 86 to the multiplier 87 which also receives the value $A_1 + B_1 - C_1$ through the link 88 also from the accumulator 86.

Finally, the value of the degree of the risk of conflict between the marks $MP_1$ and $MC_1$ may be disposed at the output 89 of the multiplier. This result is transmitted to a general memory 90 with the data $MP_1$ and $MC_1$ coming from the outputs 91 and 92 of the memories $m_1$ and $m_2$ excited by the circuit 9. The information ($R_1$ $MP_1$, $MC_1$) may be transmitted simultaneously to the memory of a print out to form the list of all the proposed marks which are liable to result in a risk of confliction with the known mark $MC_1$, then those of the marks MPx liable to result in conflict with the known mark MCy and so on. This additional information may, however, be useful only for some known MC marks which may be indexed on a parameter card and which obviously cannot be checked for the calculation of R. In this case, the additional printout is suppressed. More generally, two links 93 and 94 connected to the outputs of $m_1$ and $m_2$ make it possible to compare the parameter information contained in mpr with the information MP and MC triggering in this manner any desired modification, for the analyzed pair of the values S, A, B, C, D. For this purpose, the links 95 to 99 are provided between mpr and the memories mS, mA, mB, mC and mD. The link 100 even makes it possible to transmit the desired modification to the memory 90 and consequently to process the information ($R_1$, $MP_1$, $MC_1$) in a special manner if it is to be associated with the special information ($pr_1$, 1) if it exists.

When all the pairs have been analyzed, the memory 90 contains all the pairs checked, i.e., all the pairs R for which Sr is greater than or equal to Sm, taking into account special modifications of this value for some of them on account of the parameter cards. The results are then sorted in order to establish a classified condition by proposed MP marks, the MC marks checked being classified for each MP mark in increasing or decreasing order of the calculated values R. For this purpose, the detection of the last pair may be obtained by the logic AND circuit 101 receiving the simultaneous excitations of the circuits 81 and 83, these circuits being excited precisely by the last card MPn and the last mark $MC_k$. The output 102 of the logic AND circuit 101 controls sorting circuits which are assumed, for clarity of the drawings, to be included in the memory assembly 90 and make it possible to obtain the desired information thus classified at the output 103. The circuit 103 is connected to the print-out device 3.

Although the apparatus for carrying out the method of the present invention has been described for use with certain logic circuits it is obvious that the present invention would also conprise the re-grouping of certain of these logic circuits common to several operations.

Similarly, the curves A, B and C in FIG. 3 and Tables shown in FIGS. 4 and 5 are given only by way of example, since the marks of a country of a given language may necessitate many modifications by parameter cards. It will also be noted that the values indicated in these Tables may be modified if necessary, for example, when, on account of common roots or repetition of groups of letters in numerous marks, the calculation of the degree of the risk of confliction leads to the checking of a relatively large number of ($MC_i$ MP) pairs for the same MP mark. Then the value of the minimum Sm quantity below which the corresponding pair is eliminated, may be increased automatically. This automatic increase to a value S'm may be effected for example as soon as 10 pairs have been selected. The 10 pairs already checked, for which S may be greater or less than S'm, may be retained, since, at the end of the comparison and calculation, these pairs will be classified by order of the increasing or decreasing degree of the risk of confliction and, in any case, one need not print the pairs for which S is less than S'm.

In the case of not processing one single MP card, but the $MP_1 \ldots MP_n$ group according to the above described method, the number of times Njh that marks of the series $MC_1, MC_2 \ldots MC_h$ have been checked to calculate R may be be associated with the mark $MP_j$. As soon as this number exceeds 10, it is no longer necessary to modify this value and the calculation of R for the pairs $MC_1$, MPj for $1 > h$ need only be made when S is greater than or equal to S'm > Sm.

For this purpose, the mark MPj transmitted by the link 91 contains the information Njl indicating the number of times this mark has been checked for the calculation of R.

A unit adding device 104 increases the transmitted number of a unit, then through the link 105, transmits the new value of Mjl to the corresponding memory position of the memory $m_1$ in which this number replaces the old one. Hence, each time MPj is transferred to the memory positions 90, the value of Mjl is increased by a unit. When this value reaches the number 10, a logic circuit of the adding device 104 excites the circuit 106 connected to the memory mS. This excitation triggers the internal logic circuit of the memory mS modifying the excitation of the circuits 55 and 57 which indicate respectively whether the values of S are greater than or less than Sm or if these values are less than Sm. This triggering operation has the effect of substituting for Sm a value S'm greater than Sm so that the circuits 55 and 57 are excited for values making it possible to eliminate pairs not reaching a degree of risk of conflict greater than normal criteria.

It will be noted also that the quantity "a" representing the length of the sequences common to MP, MC, is an important variable in the evaluation of the coefficient of similarity and therefore it is possible to eliminate pairs not having a common sequence or a sequence comprising a very small number of letters, the calculation then being interrupted. A logic circuit is then provided in the unit 60 for blocking the outputs 62 and 63 and transmitting, through the link 107 the control for exciting the circuit 27 triggering the comparison of the MC mark concerned with the mark MPj + 1, following the mark MPj for which the calculation has been interrupted.

When, on the contrary, the number $a$ of letters of the longest sequence is very high or the whole mark MC, for example is contained in the MP mark, it is not necessary for the value $c$ relating to the number of letters not contained in MC should remove the infringement discovered, as in the following example (BRALL, SUPERBRALL).

This is the reason values above 100 have been selected for the function A which reaches the value 120 for similar marks of 15 letters. An alteration of the Table A could be effected in certain special cases in order to reduce even further the incidence of the function C. Another output 108 has therefore been provided for the unit for finding sequences 60, this output being connected to the memory mA. This link 108 releases new values of the function A in the particular case concerned, that is to say, each time a particular condition transmitted by the circuit 109 causes excitation of the special circuit of the unit 60. This special condition has been symbolised by the connection of a circuit 109 with the memory mpr.

Finally, the marks could be automatically transcribed in a universal phonetic form or in a form peculiar to the language concerned. Hence, marks formed of known foreign words could be processed simultaneously in a phonetic form in the language of the country in which the mark is registered and in the phonetic form of the foreign language from which the mark is issued.

With regard to synonyms of certain names and translations of known terms, these may be taken into account by means of an index originally recorded on any carrier, tapes or cards, giving the synonyms and translations of each key word. Circuits similar to those described for the memories m could be provided for automatically finding the synonyms and translations of all important marks having corresponding indexed words.

What we claim is:

1. An apparatus for automatically finding and classifying trade marks or similar distinguishing signs MC of a first series representing marks previously registered and which have similarities capable of involving a risk of conflict R with trade marks or similar distinguishing signs MP of a second series representing marks presented for registration or use, said series of trade marks MC and MP each being represented by groupings of letters, comprising:

a. first memory means for recording said MC and MP groupings,
   b. comparing and counting means for analyzing, pair by pair, each pair comprising an MCi grouping and an MPj grouping to determine for each pair, the number $l$ of the letters in the shortest trade mark, the number L of the letters in the longest trade mark, the number $a$ of letters of the longest continuous or discontinuous sequence common to both groupings and disposed in the same relative positions within the sequence, the number $b$ of letters common to both groupings other than those of the longest sequence, the number $c$ of letters of the longest grouping not found in the other grouping,
   c. second memory means for storing predetermined values of the functions $A(a, l)$, $B(b,L)$ and $C(c,L)$ having increasing slopes for increasing values of $a$, $b$ and $c$, respectively, for $l$ and L constant, and
   d. adding means connected to receive from said second memory means the values Aij, Bij and Cij corresponding to the numbers $l$, L, $a$, $b$, and $c$ determined by said comparing and counting means for determining a coefficient of similarity (Aij + Bij − Cij) proportional to said risk of conflict R.

2. An apparatus as claimed in claim 1, wherein said second memory means additionally stores predetermined values of a correction factor D which is a function of the similarities of all the information associated with said groupings relating to goods and services, said apparatus further comprising multiplying means connected to said adding means and said second memory means for multiplying said coefficient of similarity (Aij + Bij − Cij) by a correction factor Dij corresponding to similarity between the goods or services of the pair of groupings MCi and MPj being analyzed to compute said risk of conflict R.

3. An apparatus as claimed in claim 2, wherein said second memory means additionally stores predetermined values of a function of selection S $(s, l, L)$, where S = L − C, said apparatus further comprising logic means connected to said comparing and counting means and said second memory means for determining for each pair of groupings MCi and MPj analyzed whether the function $S(s, l, L)$ exceeds a predetermined threshold value Sm, said logic means being further connected to said adder means and said multiplying means to inhibit the computation of said risk of conflict R if the function $S(s, l, L)$ does not exceed said predetermined threshold Sm.

4. An apparatus as claimed in claim 3, further comprising sorting and printing means connected to receive the computed risk of conflict Rij for each selected pair of groupings MCi and MPj for recording according to the increasing or decreasing values of the risk of conflict R with corresponding MCi groupings checked.

5. An apparatus as claimed in claim 3, wherein said first memory means comprises a logic circuit composed of:
   a. a first circuit for the recording of the sign read in the MP or MC grouping at a position which is a function of the line of the sign in a predetermined order, an alphabetic order for a letter and
   b. a second circuit recording, in a memory position attached to the said sign, the number of times it is detected in the group.

6. An apparatus as claimed in claim 5 wherein said comparing and counting means comprises:
   a. at least one adding device to calculate the number of letters of the MP and MC groupings,
   b. a comparing logic circuit to determine the smallest and the largest of the numbers $l$ and L, and
   c. an accumulator circuit to accumulate the positive differences of the numbers attached to each letter, thus determining the variable $c$.

7. An apparatus as claimed in claim 5, further comprising third memory means for storing the values of the quantities $c, s$, L and $l$, the said third memory means being connected, on the one hand, to said comparing and counting means for controlling the transfer of these values and on the other hand, to said first memory means for the transfer of the values of said functions to said adding means and said multiplying means.

8. An apparatus as claimed in claim 5, wherein said comparing said counting means comprises an accumulator connected to the said first memory means for totalling the differences of the values attached to each sign of the MP and MC groupings, said accumulator being connected to said second memory means containing the function of selection S for the transfer of the variables $s, l$, L, said second memory means being connected to said logic means controlling said adding and multiplying means.

9. An apparatus as claimed in claim 3, further comprising an adding device connected to said first memory means wherein the MP groupings are recorded, said first memory means comprising a position for recording the number of times the MPj grouping has resulted in the establishment of the calculation of the risk of conflict R by said adding means and said multiplying means, the said adding device including a logic circuit connected to said second memory means containing the function S, said logic circuit exciting a controlled circuit of said second memory means each time said adding device reaches a predetermined value for MPj, this control circuit substituting a higher value S'm for the threshold value Sm.

10. An apparatus as claimed in claim 3, wherein said logic means comprises a blocking logic circuit blocking the control circuits of said second memory means containing the function A and triggering the comparing of the group MPj + 1 without the calculation of Rij each time the quantity $a$ relating to the grouping MPj is less than a given value.

* * * * *

UNITED STATES PATENT AND TRADEMARK OFFICE
CERTIFICATE OF CORRECTION

PATENT NO. : 3,952,184

DATED : April 20, 1976

INVENTOR(S) : Paul Bassard

It is certified that error appears in the above-identified patent and that said Letters Patent are hereby corrected as shown below:

Col. 1, line 26 - delete "mecanography" insert --mechanography--
line 48 - delete "zone" insert --zones--

Col. 2, line 63 - after "of" (first occurrence) insert --the--
line 67, after "B (b,L)" insert a comma
line 67, after "C (c,L)" insert a comma Col. 3, line 52 - delete "numbers" insert --number $\underline{s}$--

Col. 4, line 23, delete "oorder" insert --order--
line 33 - after "pairs" delete "of"
line 54, delete "confliction" insert --conflict--

Col. 5, line 2 - delete "confliction" insert --conflict--
line 52 - after "required" insert a comma Col. 6, line 3 - delete "In" insert --in--
line 5 - after "carriers" delete the semi-colon insert --such as--
line 15 - delete "presented" insert --presenting--
line 55 - delete "15" (second occurrence)

Col. 8, line 23 - delete "1T" (first occurrence) insert --1I--
line 32,- delete the comma after "Im" (second occurrence)
line 54 - delete "and" insert --had--
line 66 - delete the comma after "invention" insert the comma after "Fig. 1"

Col. 9, line 6 - after "mS" insert a comma
line 8 - delete "$\chi$" (sign) insert --x-- (letter)

Col. 10, line 21 - delete "effectd" insert --effected--

UNITED STATES PATENT AND TRADEMARK OFFICE
CERTIFICATE OF CORRECTION

PATENT NO. : 3,952,184
DATED : April 20, 1976
INVENTOR(S) : Paul Bassard

It is certified that error appears in the above-identified patent and that said Letters Patent are hereby corrected as shown below:

Col. 11, line 30 - delete "reprsented" insert --represented--

Col. 12, line 53 - delete "interuppted" insert --interupted--
line 58, after "4" insert a comma
line 63 - delete "62." insert --62a.--
line 67 - after "letters" insert a comma Col. 13, line 16 - delete "accumulated" insert --accumulator--
line 26, delete "computer" insert --circuit--
line 29 - delete "9" insert --69--
line 48 - delete "invertor" insert --inverter--
line 59 - after "memories" delete ", $m_1$ $m_2$" insert --$m_1$, $m_2$--

Col. 14, line 6 - delete "9" insert --79--
line 6 - after "($R_1$" insert a comma
line 50 - after "circuits" insert a comma Col. 18, line 6 - after "compairing" delete "said" and insert --and--
line 34 - delete "group" insert --grouping--

Signed and Sealed this

Thirtieth Day of November 1976

[SEAL]

Attest:

RUTH C. MASON
*Attesting Officer*

C. MARSHALL DANN
*Commissioner of Patents and Trademarks*